Patented Mar. 12, 1935

1,994,073

UNITED STATES PATENT OFFICE 1,994,073

COMPOSITION FOR IMPREGNATING WOOD AND OTHER CELLULOSIC MATERIALS

Ernest F. Hartman, Kenilworth, N. J., and Willet F. Whitmore, Amityville, N. Y., assignors to Protexol Corporation, Kenilworth, N. J., a corporation of New York No Drawing. Application July 12, 1930, Serial No. 467,614

5 Claims. (Cl. 134—78.6)

The present invention has for its object, provision for a process of, and water soluble composition for, impregnating wood and other cellulosic materials, to render the same resistant to fire and to attacks of various fungi and insects, in such manner that the materials are not readily leached out by water, and the natural hydroscopic tendencies of certain of the salts employed are materially modified by changes which occur subsequently to the treatment.

One of the disadvantages of the many fireproofing methods for wood and cellulosic materials which have been proposed in the past is that the salts and compounds employed for the purpose are generally soluble in water, and are easily removed from the product containing them by contact with water. Wood and other cellulosic materials containing these salts and compounds also have an affinity for water, with the result that with high humidities, the treated product becomes moist.

In the present process the salts and reaction products deposited are not only toxic to bacteria, fungi and insects, and also possess fire-proofing qualities, but some of them are relatively insoluble in water as well as being non-volatile, and hence, the treatment possesses permanence.

In this process and particularly in the treating solution use is made of the following compounds:—

Zinc choride or other water soluble zinc salts, copper sulphate or other water soluble copper salts, ammonium chloride, sodium fluoride, ammonium sulphate, mono-ammonium phosphate, and also the di-ammonium phosphate, boric acid, sodium chromate, and sodium borate.

The characteristic of the process is incorporation in one solution of a mixture of ions which are effective as fire retardants, fungicides and insecticides, and which in association in the material treated, are re-arranged so that during the drying of the material treated, a deposition and precipitation of soluble and insoluble salts results, the insoluble salts not only serving the threefold purpose just enumerated, but also materially improving the permanence of the treatment. To that end, the compound comprises a metallic salt such as zinc chloride or copper sulphate or both, serving as a toxic material, in combination with an ammonium salt such as ammonium sulphate, phosphate or chloride, serving as a fire-retarding substance, this mixture in combination with a hydrogen-ion forming substance such as hydrochloric acid, which serves to retard precipitation of insoluble forms of metallic salt, as for example, in the form of phosphate of zinc, when zinc is employed as the metallic salt.

As an example, we may employ a solution containing:

| | | |
|---|---|---|
| Ammonium sulphate | approx. | 60 grams |
| Mono-ammonium phosphate | approx. | 10 grams |
| Boric acid | approx. | 10 grams |
| Zinc chloride | approx. | 10 grams |
| Water | approx. | 250 c. c. |
| Muriatic acid | approx. | 2 c. c. |

This solution can be conveniently prepared by dissolving the phosphate of ammonia and the sulphate in 120 c. c. of water, the boric acid in 105 c. c. of hot water and the zinc chloride in 25 c. c. of water, preferably warm, and then combining the three solutions so prepared. If the muriatic acid is omitted or not employed, some phosphate of zinc may separate out as a precipitate from such a mixture; also a little zinc borate. If the small quantity of muriatic acid is employed it inhibits the formation of these two insoluble forms. When a solution containing the above salts is injected into wood or any other cellulosic article which it is desired to protect according to the above specifications, and this product is ultimately dried in the normal manner there results a precipitation or a deposition of various salts. In this case, when final equilibrium in the impregnated product has been reached, there will be certain quantities of all of the originally employed salts and also varying amounts of phosphate of zinc, zinc ammonium phosphate, zinc ammonium sulphate and zinc borate and ammonium chloride. These latter salts will have been produced as the result of chemical changes, whereas the original salts will be deposited solely as the result of evaporation of the menstruum which is carrying them in solution.

In explanation of this change it might be said that acids, bases and salts when dissolved in water, undergo a dissociation or ionization. In the case in point therefore, when we mix together the phosphate and sulphate of ammonia with boric acid and zinc chloride, we are really concerned with a solution which contains the zinc ion, chloride ion, ammonium ion, hydrogen ion, borate ion, phosphate ion and sulphate ion, and when muriatic or hydrochloric acid is employed we increase the amount of hydrogen ion, and also the chloride ion. These ions tend to reach a chemical equilibrium which is dependent upon their concentration, temperature, and acidity of the solution. In a strictly neutral solution containing the above ions, zinc borate, zinc phosphate and zinc ammonium phosphate would precipitate out as solids until one of the ions causing the precipitation was exhausted. In the presence of acid, however, no such precipitation ensues if the acid concentration is high enough. Since the acid simply serves to supply hydrogen ion, this of course, is equivalent to saying that no precipitation of the insoluble salts will occur when the hydrogen ion concentration is sufficiently high, and in the case being discussed 2 c. c. of concentrated hydrochloric acid will prevent precipitation. Zinc chloride solutions are always acidic due to the fact that this salt when dissolved in water always produces some hydrochloric acid by hydrolysis with water, and since this salt has been used in relatively high concentrations for the treating of timber without any deleterious effects, there can be no real objection to adding an additional small quantity of this acid to such a solution as described above.

When a solution containing the ions already mentioned in the previous paragraph is injected into timber, a portion of this solution is retained by the product being treated and in this retained portion we have a mixture of ions which are gradually coming to an equilibrium. The hydrogen ion which has inhibited the formation of the insoluble zinc borate, zinc phosphate and zinc ammonium phosphate is being supplied by the muriatic acid present. This acid is volatile and as the treated product is dried and the hydrochloric acid is gradually volatilized these water insoluble forms are slowly produced. These insoluble forms serve to close up the pores of the wood and serve to protect the soluble forms against solution in water when the product comes in contact with this solvent. In addition to the formation of these forms which the presence of acid inhibits we also gradually obtain the relatively insoluble zinc ammonium sulphate which possesses the same value as a factor in contributing to fixation or permanence as the other forms referred to as soluble in acid. If it is desired for any reason to work with an alkaline solution the above mixture may be employed and the hydrochloric acid omitted. In this case the solution can be rendered strongly alkaline with ammonia, in which event the zinc will be retained in solution in the form of ammonia zinc complexes, and in the normal drying operation due to the loss of the volatile ammonia, the insoluble forms of zinc will gradually make their appearance throughout the mass of the cellulosic material. These forms inhibit greatly the removal of the more soluble ones when the product is exposed to water.

In addition to the insoluble forms produced by double decomposition as above described molecular compounds are produced, such as zinc ammonium sulphate which would be formed in appreciable amounts from the mixture cited.

Other solutions which have been found to be efficacious in such treatment to impart the three characteristics differ somewhat in composition from the single illustration already given, but they all make use of the concept and idea which has been advanced for the explanation of the functioning of that specification. For example:

(A) Zinc chloride_____approx. 30 grams
    Ammonium sulphate_____approx. 60 grams
    Mono-ammonium phosphate_____approx. 15 grams
    Water_____approx. 300 c. c.
    Muriatic acid_____approx. 3 c. c.
    Sodium chromate or bichromate_____approx. ½ gram The addition of sodium chromate very appreciably reduces any corrosive action which this solution would normally exhibit, and also minimizes the corrosion of nails, brass or any other metal which comes in contact with timber that has been treated with this solution.

If it is desirable to work with an ammoniacal solution rather than an acidic one, the following solution may be employed:—

(B) Zinc chloride_____approx. 20 grams
    Di-ammonium phosphate_approx. 10 grams
    Ammonium sulphate_____approx. 60 grams
    Water_____approx. 275 c. c.
    Strong ammonia_____approx. 50 c. c.

Also to illustrate how to employ copper the following specification is given:—

(C) Copper sulphate_____approx. 20 grams
    Mono-ammonium phosphate_____approx. 10 grams
    Ammonium sulphate_____approx. 60 grams
    Boric acid_____approx. 10 grams
    Hydrochloric acid_____approx. 5 c. c.
    Water_____approx. 275 c. c.

The following is another specification for a solution which acts effectively according to the claim:

(D) Zinc chloride_____approx. 40 grams
    Boric acid_____approx. 10 grams
    Mono-ammonium phosphate_____approx. 30 grams
    Water_____approx. 250 c. c.
    Muriatic acid_____approx. 3 c. c.

This solution of mixed salts to which a little muriatic acid has been added is somewhat richer in the ingredients imparting toxicity, and the use of a solution of this composition also leads to a greater production of the insoluble salts of zinc so that even greater stability to solution or leaching of the salts by water is obtained.

When this solution is employed as well as other solutions containing different proportions of the salts, a number of chemical changes occur during the period of drying and during the subsequent action that takes place when the wood or cellulosic material is exposed to the atmosphere. Some of the most important changes which occur may be accounted for by assuming that the substances when dissolved in water undergo the familiar transformation, whereby they produce the ions which are normally produced from each substance. For the substances used in the solutions indicated the principal ionization is that indicated by the following ionic equations:

$$ZnCl_2 \rightleftharpoons Zn^{++} + 2Cl^-$$

$$(NH_4)_2SO_4 \rightleftharpoons 2(NH_4)^+ + SO_4^=$$

$$(NH_4)H_2PO_4 \rightleftharpoons NH_4^+ + H^+ + HPO_4^=$$

$$H_3BO_3 \rightleftharpoons H_2O + HBO_2$$

$$HBO_2 \rightleftharpoons H + BO_2^-$$

$$HCl \rightleftharpoons H^+ + Cl^-$$

$$NaF \rightleftharpoons Na^+ + F^-$$

When, therefore, water solutions of these substances are employed, we not only have some of the un-ionized molecular species present, but we also have present the various ions produced by these compounds when they are dissolved in water. As the solution is gradually concentrated or as the water is gradually lost from such a solution, or as the solution becomes more basic due to loss of the volatile hydrochloric acid, either in the kiln drying of material which has been treated with such a solution, or simply by exposure to the atmosphere, two changes occur. In one case, we obtain a deposition of some of the substances which are originally employed, i. e. some ammonium phosphate, ammonium sulphate, zinc chloride and boric acid precipitate out as solids. This deposition of compounds results simply from loss of solvent. The other change which results in the production of new chemical substances is one in which the ions enumerated above play a very important part. Some of the principal changes of this character which take place in this improved process as the menstruum evaporates and the solution becomes progressively more basic or less acidic are the following:

$$Zn^{++} + 2F^- \rightarrow ZnF_2$$

$$Zn^{++} + 2NH_4^+ + 2SO_4^= \rightarrow ZnSO_4(NH_4)_2SO_4$$

$$Zn^{++} + PO_4^\equiv + NH_4^+ \rightarrow ZnNH_4PO_4$$

$$3Zn^{++} + 2PO_4^\equiv \rightarrow Zn_3(PO_4)_2$$

$$NH_4^+ + Cl^- \rightarrow NH_4Cl$$

$$Zn^{++} + 2BO_2^- \rightarrow Zn(BO_2)_2$$

When copper salts are used the copper ion is produced, and in general it behaves similar to the zinc ion in the above transformations.

The ionic changes represented above and which produce the new salts are retarded in the treating or impregnating solution by controlling the concentration of the solution and by adding a small amount of muriatic or hydrochloric acid. During the drying operation, which wood or any other cellulosic material would subsequently be subjected to, following the impregnation treatment, both water (solvent) and hydrochloric acid would gradually be lost, so that the substances finally depositing would be, as just described above, some of the initially employed compounds together with the compounds formed as a result of the chemical changes indicated above.

It is not intended to limit the specifications to the exact proportions of ingredients herein given, since it is found convenient to vary these proportions greatly in the treatment of various species of timber or other fibrous materials. This process with variations in the proportions of salts comprising the mixture can be employed for the treatment of materials which will be subject to the rigorous tests which atmospheric exposure imposes as well as the forms which will be used for interior work.

While zinc chloride is mentioned specifically, it is not intended that it be assumed that this is the only zinc compound which will serve; any of the other water soluble zinc salts such as the sulphate, nitrate or acetate may be substituted for the chloride. It has been found in experiments to be most convenient to employ the chloride of zinc. The same applies to copper, and while copper sulphate has been mentioned it should be understood that other water soluble copper salts such as the acetate and chloride can be employed.

It is well recognized that germicidal agents and fungicides must be water soluble to be effective, and it is further agreed that all of the inorganic salts employed for these purposes owe their efficacy largely to the presence of certain ions which are produced when these salts dissolve in water. A substance then may contain highly toxic ingredients or elements and yet be so insoluble that it ceases to exert any fungicidal or germicidal effect.

In the process herein described some relatively insoluble forms are produced during the production of the final equilibrium, such as zinc phosphate, zinc ammonium sulphate, zinc fluoride, zinc borate, zinc ammonium phosphate, and also, when copper is employed, the corresponding copper salts. According to the above ideas these insoluble forms, while greatly aiding the permanence of the treatment, would appear to lower its effectiveness so far as toxicity is concerned. Recently, however, it has been proven that most bacteria and all fungi during their normal metabolism produce organic acids. The acids so formed then serve as solvents for the insoluble salts above enumerated, which are soluble in acids, and hence they or the ions produced by their solution serve effectively as toxic substances.

We claim:

1. A composition for the impregnation of wood and other cellulosic materials comprising a water solution of a metal salt, a fluoride such as sodium fluoride, an ammonium salt and a material serving to retard precipitation of insoluble metal salts, such as muriatic acid.

2. A composition for the impregnation of wood and other cellulosic materials comprising a solution containing the following:

| | |
|---|---|
| Ammonium sulphate | approx. 60 grams |
| Mono-ammonium phosphate | approx. 10 grams |
| Boric acid | approx. 10 grams |
| Zinc chloride | approx. 10 grams |
| Water | approx. 250 c.c. |
| Muriatic acid | approx. 2 c.c. |

3. A composition for the impregnation of wood and other cellulosic materials comprising a solution containing the following:

| | |
|---|---|
| Zinc chloride | approx. 30 grams |
| Ammonium sulphate | approx. 60 grams |
| Mono-ammonium phosphate | approx. 15 grams |
| Water | approx. 300 c.c. |
| Muriatic acid | approx. 3 c.c. |
| Sodium chromate | approx. ½ gram |

4. A composition for the impregnation of wood and other cellulosic materials comprising a solution containing the following:—

| | |
|---|---|
| Copper sulphate | approx. 20 grams |
| Mono-ammonium phosphate | approx. 10 grams |
| Ammonium sulphate | approx. 60 grams |
| Boric acid | approx. 10 grams |
| Hydrochloric acid | approx. 5 c.c. |
| Water | approx. 275 c.c. |

5. A composition for the impregnation of wood and other cellulosic materials comprising a solution containing the following:—

| | |
|---|---|
| Zinc chloride | approx. 40 grams |
| Boric acid | approx. 10 grams |
| Ammonium phosphate | approx. 30 grams |
| Water | approx. 250 c.c. |
| Muriatic acid | approx. 3 c.c. |

ERNEST F. HARTMAN.
WILLET F. WHITMORE.